L. E. FISCHER & G. W. BURTON.
PASSENGER CAR CONSTRUCTION.
APPLICATION FILED OCT. 21, 1911.
1,217,931.
Patented Mar. 6, 1917.
2 SHEETS—SHEET 1.
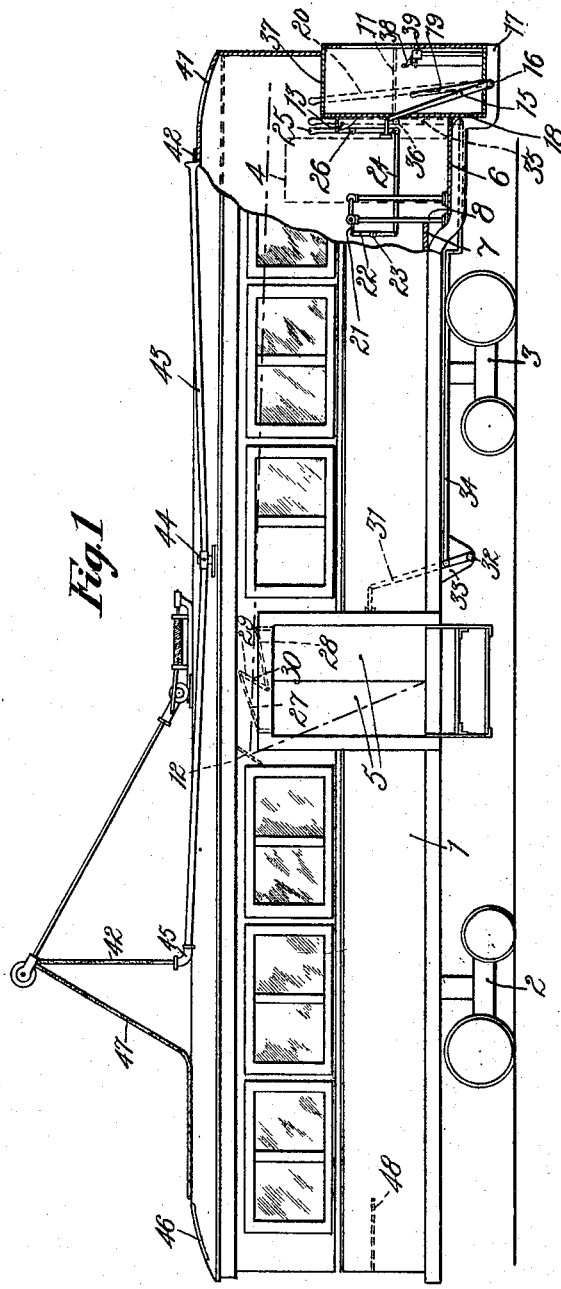
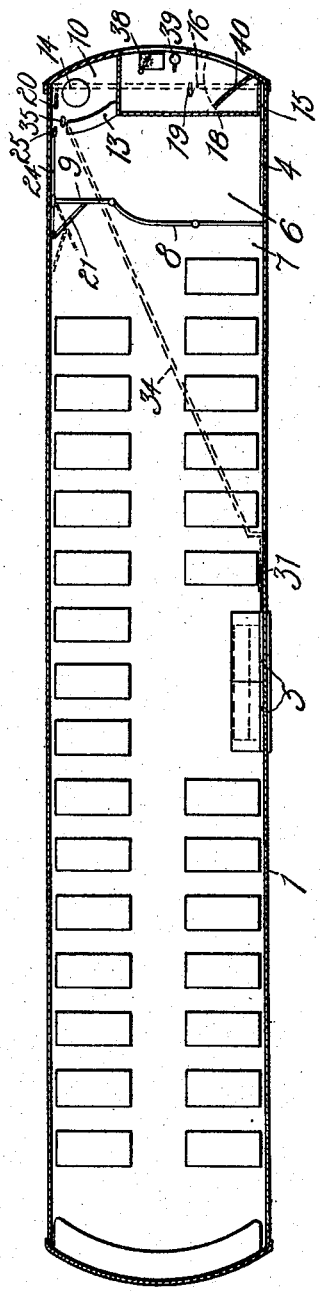
Witnesses:
Robert F. Bracke
Leonard W. Novander
Inventors
Louis E. Fischer
George W. Burton
By George W. Burton
Attorney L. E. FISCHER & G. W. BURTON.
PASSENGER CAR CONSTRUCTION.
APPLICATION FILED OCT. 21, 1911.

1,217,931.

Patented Mar. 6, 1917.
2 SHEETS—SHEET 2.

UNITED STATES PATENT OFFICE.

LOUIS E. FISCHER, OF ST. LOUIS, MISSOURI, AND GEORGE W. BURTON, OF PEORIA, ILLINOIS.

PASSENGER-CAR CONSTRUCTION.

1,217,931. Specification of Letters Patent. Patented Mar. 6, 1917.

Application filed October 21, 1911. Serial No. 656,000.

*To all whom it may concern:*

Be it known that we, LOUIS E. FISCHER and GEORGE W. BURTON, citizens of the United States, residing at St. Louis, in the State of Missouri, and at Peoria, in the county of Peoria and State of Illinois, respectively, have invented certain new and useful Improvements in Passenger-Car Constructions, of which the following is a full, clear, concise, and exact description, reference being had to the accompanying drawings, forming a part of this specification.

Our invention relates generally to passenger cars and especially to improvements in that type of car designated "near side car" designed for stopping on the nearside of highway intersections.

Our invention has in view a car adapted to nearside operation in which not only confusion in ingress and egress is avoided and convenient and expeditious movement of passengers facilitated, but in which efficiency of fare collection and convenient discharge by the conductor, or operator, at forward end of car of the several duties devolving upon him is promoted.

Our invention further is intended to secure in operation added safety to both passengers and pedestrians.

In attaining these and other objects of our invention hereinafter appearing our car provides for an operator's location preferably normally isolated from passengers, commanding observance of all persons boarding car and enabling better control with reference to objects as approached on the track.

Further our invention provides for entrance of passengers normally at forward end only of car and for departure normally by separate exit so removed from ingress point as to avoid congestion in the movements of passengers boarding and those leaving car.

Our car provides also for initial entrance directly into passenger section.

Our invention further places the conductor normally on a plane above that of the passengers from which he can observe ingress and readily secure fares of all passengers entering as well as witness each passenger's departure from car.

Further our invention enables conductor or operator from the forward end of car without loss of time or inconvenience to readily discharge his several duties, including care of the trolley.

Our invention will be more readily understood by reference to the accompanying drawings in which—

Figure 1 shows in side elevation a car embodying the various features characterizing our invention, with a view, partly in longitudinal section on substantially the center line of car, of the front end of car.

Fig. 2 is a horizontal sectional view of the car shown in Fig. 1, taken on a line above the floor of car and showing plan of car floor.

Similar numerals refer to similar parts throughout the several views.

Figure 3:
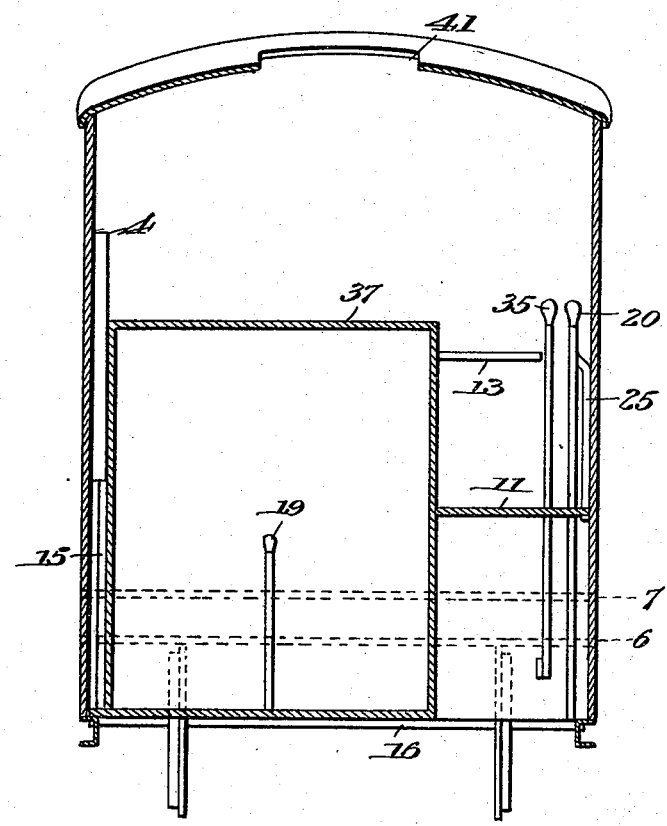
Fig. 3 is a transverse sectional view of the car shown in Fig. 1, taken at the front end of car on a plane passing through the operator's compartment.

As shown in Figs. 1 and 2, the car body 1 is supported upon trucks 2 and 3 in a manner well known in the art and in the same side of the car an ingress door 4 is disposed near the forward end of the car and egress doors 5 near the middle of the car. The ingress door 4 opens into an ingress passage 6 which may be on a level with the main floor 7 of the car or disposed slightly below as shown in the drawings if preferred. The ingress passage 6 is separated from the body of the car only by means of a railing 8 to direct the entering passengers through an entrance gate 9 in front of the conductor's station 10. As indicated in Fig. 1 the conductor is located preferably upon a platform 11 elevated above the main floor 7 of the car so that he may be able to see clearly the entire interior of the car over the heads of the passengers when any are standing in the car, and in this way have an uninterrupted view of the egress doors 5. To further provide that he may see the condition of the egress doors and whether passengers have entirely left the egress opening, a mirror 12 is provided as indicated to reflect to the conductor a view of the bottom of the egress passage and the steps leading therefrom. A counter or shelf 13 is provided in front of the conductor's position to facilitate the handling of the fares as the passengers enter the car. A stool 14 is also provided so that the conductor may be seated during the normal discharge of his duties.

The ingress door 4 is of the sliding type and has pivotally connected with its upper end a lever 15 mounted at its lower end upon a rock shaft 16 supported by the supporting beams 17 of the front end of the car. The shaft 16 extends transversely of the car and carries in the operator's compartment 18 an upwardly extending lever 19 and at its end under the conductor's platform 11 has secured to it an operating lever 20 so that either the operator or the conductor may control the ingress door 4 as desired. The entrance gate 9 has pivotally connected therewith by means of a link 21 a lever 22 pivotally supported at 23 and connected at its lower end by means of a link 24 with the lower end of the operating lever 25 pivotally mounted at 26 by means of which the conductor may control the opening and the closing of the gate 9. The egress doors are of the sliding type and are connected by links 27 and 28 with equalizing lever 29 pivotally mounted at 30, as a result of which any motion imparted one of the doors is necessarily communicated in an opposite direction to the other. The right hand edge of one of the doors, as shown in Fig. 1, is pivotally connected with the upper end of a lever 31 pivoted at 32 to a bracket 33 under the floor of the car. The lever 31 has pivotally connected therewith a connecting rod 34 extending forwardly and across the underside of the floor of the car to the lower end of a lever 35 pivotally supported at 36 in a position so that its upper end may readily be grasped by the conductor to open or shut the egress doors 5. Thus, the conductor has control from his position of all of the doors or gates which can in any way restrict the movements of the passengers either in entering or leaving the car. The car may be provided with steps in connection with the ingress or egress doors, which steps may be of any desired construction, although we preferably employ the well known type in which the steps are folded out of operative position by the closing of the associated door or doors.

The operator of the car is located in a preferably closed compartment 18 having a floor below the level of the ingress passage 6 and provided with a ceiling 37 disposed at such a height as to give ample head-room and at the same time form a convenient platform for the use of the conductor when it is necessary for him to attend to the trolley of the car. The operator's compartment 18 contains the usual electric controller 38 and air brake controlling valve 39. An entrance to the compartment is preferably had by a front swinging door 40, although the compartment may also be provided if desired with a communicating passageway into the ingress passage.

In the roof or deck of the car at its forward end is a trap door 41.

While we have shown in the accompanying drawings and specification, an inclosed operator's compartment wholly separated from the inside of the car, it is to be understood that we do not limit ourselves to constructing this compartment of any particular height, as it may be run to the roof of the car if desired, in which case a suitable ladder would be provided to enable the conductor to control the trolley through the trap door. With the inclosed type of operator's compartment, it is frequently desirable to have a window in the back of the compartment so that the operator may readily see the inclosed passage.

While we have shown our invention in the embodiments herein described, we do not, however, limit ourselves to the mechanical constructions herein disclosed, but desire to claim any equivalents that may suggest themselves to those skilled in the art.

What we claim is:

1. A passenger car in which the ingress passage, conductor's platform and operator's section are on different horizontal planes.

2. A passenger car having an operator's section and a conductor's section contiguous to each other transversely of the car.

3. A passenger car having an operator's section and a conductor's section each in contact with the front of the car.

4. In a single deck type of passenger car, the combination of an inclosed main section and an operator's section having a roof constituting a platform inside of the main section.

5. In a passenger car, the combination of a single main section and an operator's section having a roof inside of said main section, said roof serving as a platform for the conductor in adjusting the trolley pole.

6. In a passenger car, the combination of a passenger section, an ingress door, mechanism under the control of either the operator or the conductor or both for controlling the ingress door, and an egress door under sole control of conductor.

7. A passenger car having an ingress passage under joint and several control of operator and conductor and an egress door under exclusive control of conductor.

8. In a passenger car, an ingress passage under joint and several control of operator and conductor, an egress door under sole control of conductor, and means for controlling movements of passengers from said ingress passage to said egress door.

9. In a passenger car, an ingress passage and an egress door and means under the control of the conductor for restraining entrance to said ingress passage and movement of passengers between said ingress passage and egress door.

10. A passenger car having an ingress passage under control of either motorman or conductor, an egress door under control of conductor and means under control of conductor for restraining movement from ingress passage toward egress door.

11. In a passenger car, means under control of conductor for controlling entrance to and departure from car and movement within car of passengers after they have boarded and before alighting from car.

12. In a passenger car, a main section and an operator's section having a floor below the floor of said main section and having a roof inside of said main section.

13. A passenger car having a car body inclosing passenger section and ingress passage and having an operator's section depressed below the entire ingress passage.

In witness whereof, I hereunto subscribe my name as joint inventor, this 19th day of October, A. D. 1911.

LOUIS E. FISCHER.

Witnesses:
W. L. MURPHY,
F. J. BLOCK.

In witness whereof, I hereunto subscribe my name as joint inventor this 18th day of October, A. D. 1911.

GEORGE W. BURTON.

Witnesses:
ALBERT C. BELL,
ALBIN C. AHLBERG.

Copies of this patent may be obtained for five cents each, by addressing the "Commissioner of Patents, Washington, D. C."